Patented Nov. 7, 1939

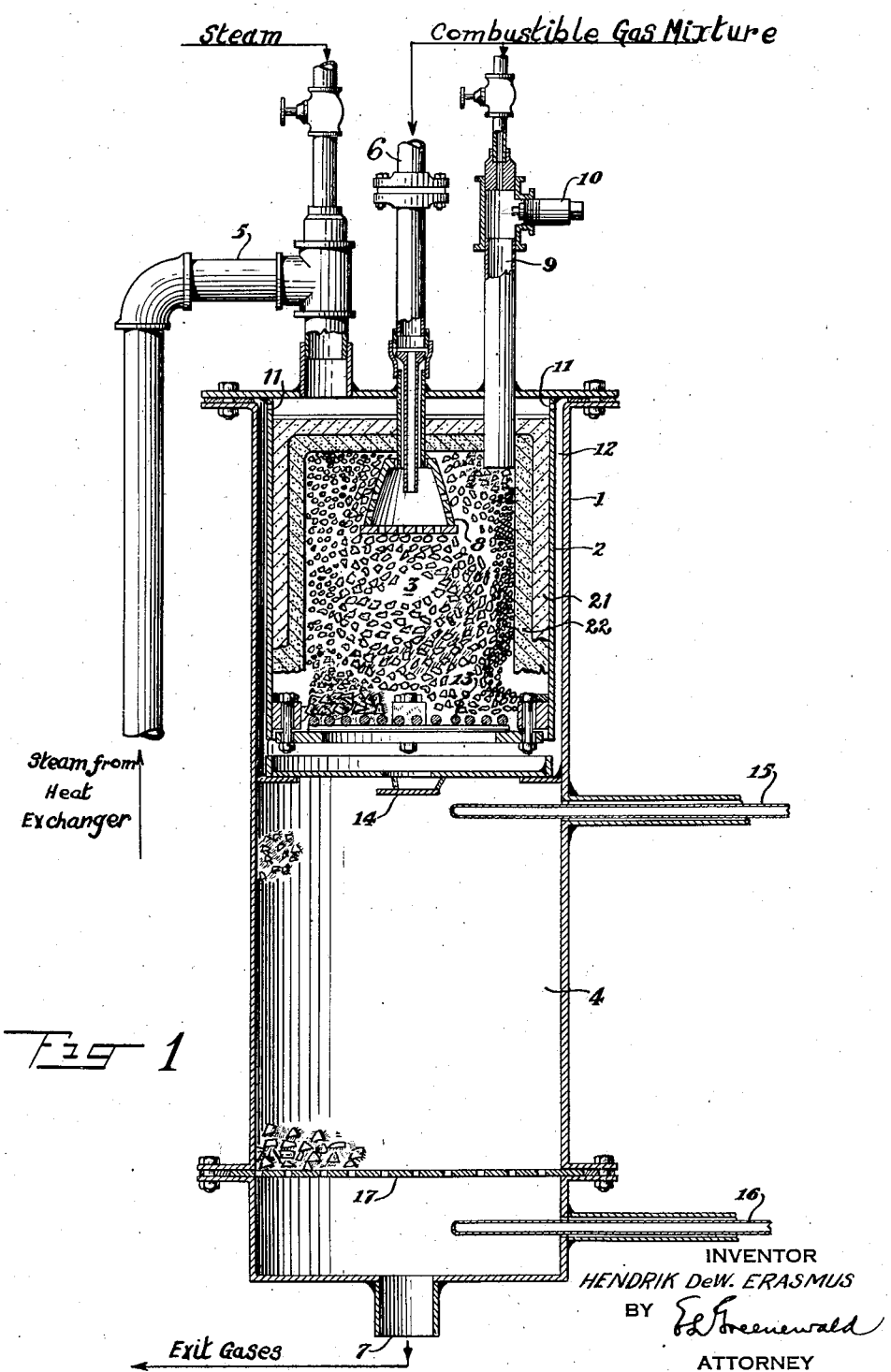

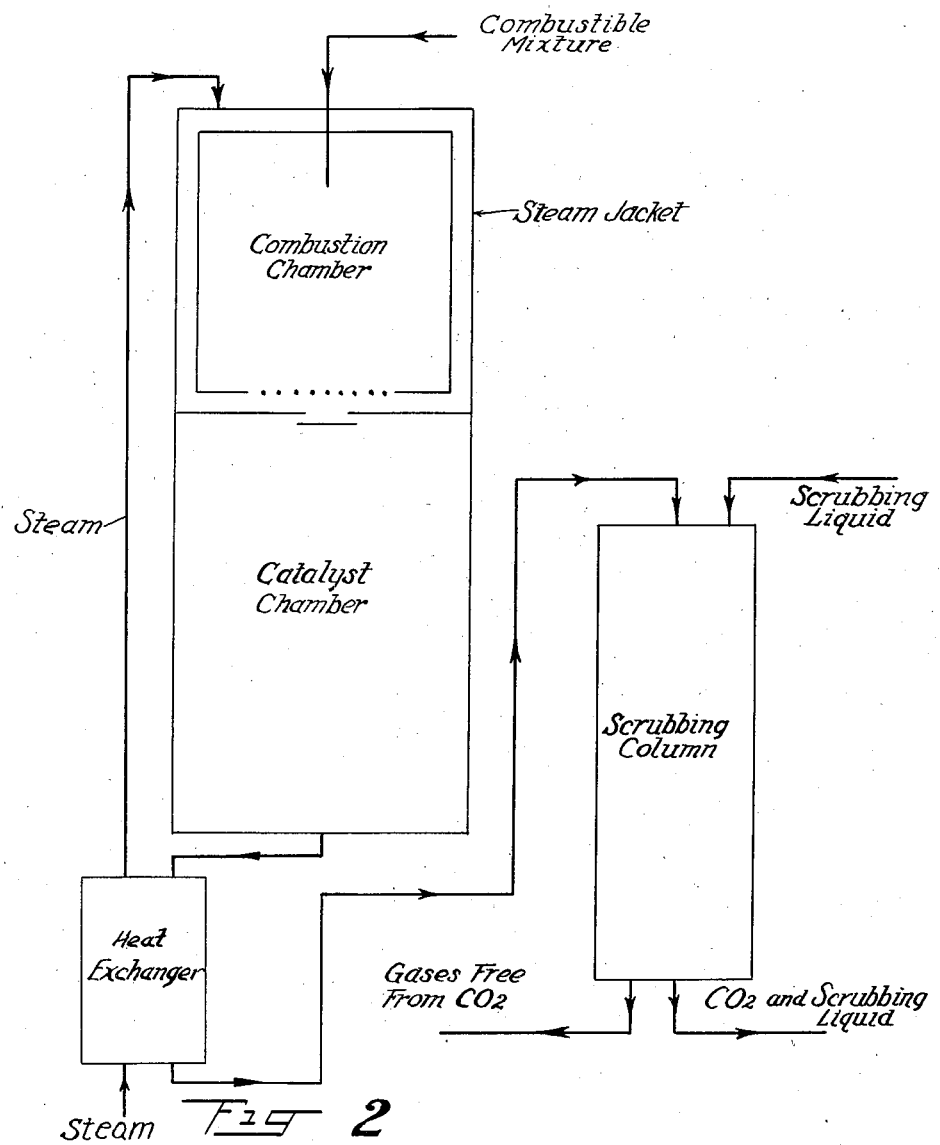

2,178,833

UNITED STATES PATENT OFFICE 2,178,833

APPARATUS FOR PRODUCING HYDROGEN-NITROGEN MIXTURES

Hendrik de Wet Erasmus, Lewiston, N. Y., assignor to Union Carbide and Carbon Research Laboratories, Inc., a corporation of New York Application July 30, 1936, Serial No. 93,336

4 Claims. (Cl. 23—288)

The invention relates to apparatus for the production, from hydrocarbon material, mixtures of oxygen and nitrogen such as air or oxygen-enriched air, and steam, of mixtures of hydrogen and nitrogen suitable for use in the "bright annealing" of metals. More particularly it relates to apparatus wherein gaseous mixtures comprising essentially hydrogen, nitrogen, carbon dioxide and carbon monoxide are produced by the partial combustion of hydrocarbon with air, preheated air or oxygen-enriched air, and then reacted with steam in the presence of a catalyst to produce mixtures consisting substantially of hydrogen, nitrogen, carbon dioxide and excess steam.

In a process of this character it is highly desirable to produce in the combustion step a mixture of gases substantially free from hydrocarbon or free oxygen, and containing as much hydrogen and carbon monoxide as possible, a high content of carbon monoxide being useful for the production of additional hydrogen in the subsequent reaction with steam, thus increasing the yield of hydrogen from a given quantity of hydrocarbon used.

It has heretofore been customary to carry out the partial combustion step of such processes within empty combustion chambers of any suitable design. However, the chemical reactions involved are so complex, and equilibrium conditions are so affected by temperature, that it has been practically impossible to control the combustion in such a manner as to produce a desirable mixture of nitrogen, hydrogen, and carbon monoxide, without leaving an undesirably large proportion of free oxygen, hydrocarbon, or carbon dust in the combustion gases. A principal purpose of the present invention is to provide means whereby a high yield of hydrogen from hydrocarbon can be obtained without introducing undesirably large proportions of free oxygen, hydrocarbon or carbon dust into the product gases. A further object of the invention is to provide compact apparatus for carrying out the combustion and steam-oxidation steps of the process, having a high production capacity for a given size of apparatus.

The present invention is based principally upon my discovery that equilibrium conditions in the partial combustion step can be closely approximated, and the presence of unreacted residues of hydrocarbon and oxygen avoided, by substantially filling the combustion chamber with crushed lump refractory material and introducing the combustion gases well into the interior of this mass of refractory with due precaution to prevent by-passage of incompletely reacted products. The temperature gradient in the direction of passage of the gases through the combustion chamber is sufficiently gradual throughout the range from 1,500° C. to approximately 500° C. so that equilibrium is closely approached as the temperature is progressively decreased. I have also found it important to cause the combustion gases so produced to be mixed thoroughly with preheated steam before they are brought into contact with the catalyst, and to control conditions within the catalyst chamber so that the reacting gases are not cooled substantially during their passage through the catalyst material. In order to obtain best efficiency from the process and apparatus I have also found it highly advantageous to conserve so far as possible the heat of the combustion reaction, and this I achieve by surrounding the combustion chamber with a concentric steam jacket through which the steam is passed, and preheated by waste heat from the combustion chamber, before it is mixed with the combustion gases. I also find it advantageous to arrange the refractory material filling the combustion chamber, substantially in the manner disclosed in Patent 2,071,721, issued February 23, 1937, entitled: "Process and apparatus for producing hydrogen by thermal cracking of hydrocarbons", of which I am joint inventor. This combination of apparatus and process steps has made possible the production of much larger quantities of better quality annealing gas mixtures, and larger yields of hydrogen from a given quantity of hydrocarbon, than was possible with apparatus and processes hitherto known.

The apparatus of the invention suitable for carrying out the process of the invention is portrayed schematically in the appended drawings. In Fig. 1 there are shown: a metal shell 1 enclosing the entire apparatus; an inner metal shell 2 enclosing a combustion chamber 3 substantially filled with refractory material; a steam oxidation chamber 4 substantially filled with catalyst material; means 5, 6, and 7 for introducing steam and combustion mixture to, and removing gaseous products from, the apparatus; a perforated bell-shaped distributor 8 for introducing gases into combustion chamber 3, a pipe 9 for igniting explosive gas mixtures within the combustion chamber by means of a spark plug 10; holes 11 through which steam enters a steam jacket 12 between the concentric shells 1 and 2; a porous grid 13 supporting the refractory material in combustion chamber 3; a baffle arrangement 14 for mixing steam and combustion gases and introducing the mixture into steam oxidation chamber 4; thermocouples 15 and 16 for measuring gas temperatures; a porous grid 17 supporting the catalyst material in steam oxidation chamber 4. A refractory lining 21 and 22 may be provided on the inside of the combustion chamber 3.

The combustible mixture of gases is introduced through a pipe 6 and a perforated bell 8 well into the interior of the mass of refractory lumps which practically fills the combustion chamber 3. The mass of refractory material, which will usually have an average free space-factor of about 50%, and may be composed of lumps of any convenient size, is maintained by the combustion reaction at an elevated and relatively constant temperature, and provides a contact surface and induces turbulent flow of gases, which together promote the rapid attainment of chemical equilibrium at the prevailing temperature of the combustion chamber. The arrangement of the refractory filling in graded concentric layers as shown in the drawing directs the flow of gases in such a manner that most of the reaction takes place in the hottest central zone of the chamber, for the flow of gases through the cooler outer portions of the chamber is decreased by the resistance of the smaller refractory lumps, thus permitting approximate equilibrium to be reached even in the cooler parts of the chamber and preventing an undue proportion of free oxygen or hydrocarbon from passing into the combustion gases produced.

Thus, among the important features of the apparatus of the invention are the elimination of large volumes of free space in the combustion chamber; the introduction of the combustible gaseous mixture, in a diffuse manner, well within the interior of the mass of lump refractory, thereby effecting surface combustion, and the arrangement of the refractory material in graded sizes as shown.

I have found it desirable, and usually essential, to limit the space velocity of the mixture of air and hydrocarbon fed to the combustion chamber to about 20 cubic feet per cubic foot per minute, based on the room temperature volume of the gases and the total volume of the combustion chamber. At higher space velocities undesirably large proportions of unreacted gases may be present. On the other hand, as the space velocity is decreased below the optimum, a point is soon reached at which the net heat developed by the partial combustion reactions is no longer sufficient to offset heat losses from the apparatus and thus maintain a proper operating temperature.

To overcome this serious limitation of the process and apparatus as heretofore carried out, I have found it desirable to enclose the combustion chamber 2 within an outer concentric metal shell 1, utilizing the space between the two shells as a channel or passage for preheating the steam used in the second step of the process, and to place the oxidation and catalyst chambers 3 and 4 respectively in juxtaposition as shown by the drawings. Numerous advantages flow from this arrangement: while the steam-oxidation reaction of the second step of the process is exothermic, the speed of the reaction is very slow except at elevated temperatures, and the heat losses from the reaction chamber are therefore considerable and must be supplied in large part by sensible heat from other sources. The amount of heat which can be supplied economically by the combustion step (as sensible heat in the combustion gases) is limited by the fact that the partial combustion of the hydrocarbon is not a highly exothermal reaction and, as has been indicated, the throughput of the apparatus is strictly limited by chemical considerations. Consequently the margin of surplus heat above the heat losses from the walls of the combustion chamber is ordinarily very small. I have found it necessary to conserve carefully the heat of the combustion reactions, and to use this heat in such a manner as to promote optimum equilibrium conditions through self-regulating temperature control in both the combustion and catalyst chambers. This I effect by using the otherwise wasted heat from the walls of the combustion chamber to preheat the steam, and by joining the combustion and catalyst chambers with a minimum length of gas passage therebetween, as shown in the drawings. It is, however, necessary to mix thoroughly the combustion gases and steam before they enter the catalyst mass, and this I may conveniently accomplish by means of a baffle system 14.

In the practice of the invention it is frequently desirable to preheat the air, or the feed gas, or both, before they are introduced into the combustion chamber, as such preheat tends to maintain favorable reaction temperatures even when producing a high yield of hydrogen.

I have also found that in the practice of the process of my invention it is desirable to introduce the mixture of hydrogen and air, preheated air, or oxygen-enriched air into the combustion chamber through the diffuser bell 8 to reduce outlet resistance. However, the construction should be such that the gases leave the bell at as high a velocity as is consistent with the requirement that this velocity must be less than the velocity of propagation of flame in the gas mixture being used under the conditions existing in the combustion chamber. If these precautions are not taken, a zone of incipient reactions may be established deeper in the mass of lump refractory and it may become difficult to determine whether combustion is properly maintained. It will also be evident that, in order to prevent back-firing, the velocity of gases at the inlet to the bell insert be greater than the velocity of flame propagation. If these two conditions are met, the point of initiation of the flame remains within the bell, as is desired.

As hereinbefore stated, in accordance with the preferred method of operation of the apparatus, the combustion gases enter the catalyst chamber at a relatively high temperature—say about 500° C.—and suffer comparatively little loss in temperature during their passage through the catalyst material. In order further to conserve heat, and at the same time to cool the gases before they enter the scrubbing apparatus for removal of water and carbon dioxide, I find it highly desirable to effect heat exchange between incoming steam and the hot gases leaving the catalyst chamber. It will be evident that, when such heat exchange has the effect of considerably raising the temperature of the incoming steam, less exchange of heat will take place in steam jacket 12 of the apparatus. However, in such case I find that the steam is effective in preventing overheating of the nickel jacket enclosing the combustion chamber, and at the same time the preheated steam serves to prevent waste of heat from the combustion chamber.

Fig. 2 of the appended drawings is a diagrammatic flow sheet wherein are shown, in outline, the apparatus disclosed in detail in Fig. 1; a heat exchanger for exchanging heat between incoming steam and hot gases leaving the catalyst chamber; and a scrubbing apparatus, which may be of any conventional type, for removing water and carbon dioxide from the gaseous product.

There is thus produced, in continuously operating apparatus of simple design and construction without the use of external heat, a maximum proportion of hydrogen, and a substantially pure mixture of nitrogen and hydrogen, from a minimum quantity of hydrocarbon material.

I claim:

1. Apparatus for the production of mixtures of hydrogen and nitrogen suitable for use in the "bright annealing" of metals, from raw materials comprising hydrocarbons of material containing hydrocarbons, mixtures of oxygen and nitrogen, and steam, which apparatus comprises, in combination, a combustion chamber substantially filled with a mass of lump refractory material; a heat-insulating lining about the walls of said combustion chamber, means for introducing combustion gases in a diffuse manner well within the body of said mass of refractory material; means for introducing steam to the outlet from said combustion chamber; a catalyst chamber contiguous with said combustion chamber and freely connected with the outlet therefrom; a porous mass of catalyst material substantially filling the catalyst chamber; and means for removing gases from the apparatus after they have passed through the catalyst chamber.

2. Apparatus for the production of mixtures of hydrogen and nitrogen suitable for use in the "bright annealing" of metals, from raw materials comprising hydrocarbons or material containing hydrocarbons, mixtures of oxygen and nitrogen, and steam, which apparatus comprises, in combination, a combustion chamber substantially filled with a mass of lump refractory material; means for introducing combustion gases in a diffuse manner well within the body of said mass of refractory material; a steam jacket surrounding said combustion chamber in a concentric manner, and connecting with the discharge opening thereof; means for introducing steam into said steam jacket; a catalyst chamber contiguous with said combustion chamber and steam jacket and freely connected with the outlets thereof; a porous mass of catalyst material substantially filling the catalyst chamber; and means for removing gases from the apparatus after they have passed through the catalyst chamber.

3. Apparatus for the production of mixtures of hydrogen and nitrogen suitable for use in the "bright annealing" of metals, from raw materials comprising hydrocarbons or material containing hydrocarbons, mixtures of oxygen and nitrogen, and steam, which apparatus comprises, in combination, a combustion chamber substantially filled with a mass of lump refractory material; means for introducing combustion gases in a diffuse manner well within the body of said mass of refractory material; a steam jacket surrounding said combustion chamber in a concentric manner, and connecting with the discharge opening thereof; means for introducing steam into said steam jacket; a catalyst chamber contiguous with said combustion chamber and steam jacket and freely connected with the outlets thereof; a porous mass of catalyst material substantially filling the catalyst chamber; baffle means between said contiguous chambers and means for removing gases from the apparatus after they have passed through the catalyst chamber.

4. Apparatus for the production of mixtures of hydrogen and nitrogen suitable for use in the "bright annealing" of metals, from raw materials comprising hydrocarbons or material containing hydrocarbons, mixtures of oxygen and nitrogen, and steam, which apparatus comprises, in combination, a combustion chamber substantially filled with a mass of lump refractory material having an average space factor of about 50%, said refractory mass being arranged in a series of concentric layers each of which is composed of lumps of substantially the same size, the layers being graded progressively from relatively larger-sized lumps near the center of the chamber to relatively small-sized lumps near the periphery of the chamber; means for introducing combustion gases in a diffuse manner well within the body of said mass of refractory material; a steam jacket surrounding said combustion chamber in a concentric manner, and connecting with the discharge opening thereof; means for introducing steam into said steam jacket; a catalyst chamber contiguous with said combustion chamber and steam jacket and freely connected with the outlets therefrom; a porous mass of catalyst material substantially filling the catalyst chamber; baffle means between said contiguous chambers; means for removing gases from the apparatus after they have passed through the catalyst chamber; and means for scrubbing the said gases to remove carbon dioxide therefrom.

HENDRIK de WET ERASMUS.

CERTIFICATE OF CORRECTION.

Patent No. 2,178,833. November 7, 1939.

HENDRIK de WET ERASMUS.

It is hereby certified that error appears in the printed specification of the above numbered patent requiring correction as follows: Page 3, first column, line 15, claim 1, for "of material" read or material; same page, second column, line 18, claim 3, after "chambers" insert a semicolon; and that the said Letters Patent should be read with this correction therein that the same may conform to the record of the case in the Patent Office.

Signed and sealed this 12th day of December, A. D. 1939.

(Seal)

Henry Van Arsdale,
Acting Commissioner of Patents.